US012812077B2

(12) United States Patent
Wu et al.

(10) Patent No.: US 12,812,077 B2
(45) Date of Patent: Nov. 24, 2026

(54) PROJECTED IMAGE CORRECTION SYSTEM AND METHOD AND NON-TRANSITORY COMPUTER-READABLE RECORDING MEDIUM

(71) Applicant: Coretronic Corporation, Hsin-Chu (TW)

(72) Inventors: Chun-Hsien Wu, Hsin-Chu (TW); Ssu-Ming Chen, Hsin-Chu (TW); Chih-Hao Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/093,266

(22) Filed: Mar. 28, 2025

(65) Prior Publication Data

US 2025/0310498 A1 Oct. 2, 2025

Related U.S. Application Data

(60) Provisional application No. 63/571,452, filed on Mar. 29, 2024.

(30) Foreign Application Priority Data

Jun. 26, 2024 (CN) ......................... 202410835166.9

(51) Int. Cl.
*H04N 9/31* (2006.01)
*G06F 3/04817* (2022.01)
*G06F 3/0486* (2013.01)

(52) U.S. Cl.
CPC ....... *H04N 9/3185* (2013.01); *G06F 3/04817* (2013.01); *G06F 3/0486* (2013.01)

(58) Field of Classification Search
CPC ...... H04N 9/31; H04N 9/3185; H04N 9/3188; G06F 3/04817; G06F 3/0486
(Continued)

(56) References Cited

U.S. PATENT DOCUMENTS

2015/0169141 A1* 6/2015 Kim ...................... G06F 3/0482 715/769
2019/0219907 A1 7/2019 Kurota et al.
2024/0015272 A1 1/2024 Park et al.

FOREIGN PATENT DOCUMENTS

CN 103365481 10/2013
CN 112702584 4/2021
(Continued)

OTHER PUBLICATIONS

"Office Action of Taiwan Counterpart Application", issued on May 8, 2025, p. 1-p. 4.
(Continued)

*Primary Examiner* — Sherrie Hsia

(57) ABSTRACT

A projected image correction system and method and a non-transitory computer-readable recording medium are provided. A processor of a portable electronic device is configured to perform the following steps: activating a display to display a function interface including multiple function icons; obtaining multiple original coordinates of multiple adjustable points corresponding to a projected image of a projector; arranging positions of the function icons on the function interface so that positional relationships of the function icons respectively correspond to positional relationships of the adjustable points in the projected image; in response to first touch-drag operation on the first function icon, generating first touch-input data for each unit of time; calculating first updated coordinate of first adjustable point corresponding to the first function icon based on the first touch-input data; and transmitting the first updated coordinate to the projector, so that the projector correspondingly adjusts the first adjustable point of the projected image to the first updated coordinate.

15 Claims, 14 Drawing Sheets

(58) Field of Classification Search
USPC ................. 348/744–747, 806, 807; 345/173; 715/769, 835
See application file for complete search history.

(56) References Cited

FOREIGN PATENT DOCUMENTS

| | | |
|---|---|---|
| CN | 116962654 | 10/2023 |
| CN | 115103169 | 2/2024 |
| TW | 202209871 | 3/2022 |
| WO | 2019119621 | 6/2019 |

OTHER PUBLICATIONS

"Search Report of Europe Counterpart Application", issued on Jul. 28, 2025, p. 1-p. 9.

* cited by examiner

PROJECTED IMAGE CORRECTION SYSTEM AND METHOD AND NON-TRANSITORY COMPUTER-READABLE RECORDING MEDIUM

CROSS-REFERENCE TO RELATED APPLICATION

This application claims the priority benefit of U.S. provisional application Ser. No. 63/571,452, filed on Mar. 29, 2024, and China application serial no. 202410835166.9, filed on Jun. 26, 2024. The entirety of each of the above-mentioned patent application is hereby incorporated by reference herein and made a part of this specification.

BACKGROUND

Technical Field

The disclosure relates to an image correction mechanism, and particularly relates to a projected image correction system and method, and a non-transitory computer-readable recording medium.

Description of Related Art

Many projectors currently feature a manual correction function that can be used to adjust a trapezoidal projected image back into a rectangular shape. The traditional four-corner correction method involves using a remote control to access the on-screen display (OSD) menu projected by the projector. The user then selects one of the four corners and adjusts its horizontal and vertical displacement by repeatedly pressing the remote control's directional keys (e.g., up, down, left, and right). After completing the correction for one corner, the user switches to the next corner and repeats the process until the projected image meets expectations and becomes a proper rectangle. Consequently, the user not only needs to select the corner to be adjusted, but each corner's deformation also involves at least two parameters (e.g., horizontal and vertical). If the adjustment range is large, the user needs to press the keys multiple times, resulting in frequent and cumbersome operations.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

Other objectives, features and advantages of the disclosure will be further understood from the further technological features disclosed by the embodiments of the disclosure wherein there are shown and described preferred embodiments of this invention, simply by way of illustration of modes best suited to carry out the disclosure.

Other objects and advantages of the disclosure may be further understood from the technical features disclosed in the disclosure.

In order to achieve one or a portion of or all of the above objectives or other objectives, the disclosure provides a projected image correction system and method and a non-transitory computer-readable recording medium, which uses the touch input function of a portable electronic device to intuitively perform image correction on the projector, so as to replace the traditional key adjustment and also replace the cursor operation of a mouse-like remote control.

A projected image correction system of the disclosure includes a projector and a portable electronic device. The projector is configured to project a projected image. The portable electronic device includes a processor and a touch-sensitive display. The portable electronic device is configured to be in communication connection with the projector. The processor of the portable electronic device is configured to execute the application to: activate the display to display a function interface, where the function interface includes a plurality of function icons; obtain a plurality of original coordinates of a plurality of adjustable points corresponding to the projected image of the projector; arrange positions of the function icons on the function interface so that positional relationships of the function icons respectively correspond to positional relationships of the adjustable points in the projected image; in response to a first touch-drag operation on a first function icon among the plurality of function icons in the function interface, generate first touch-input data for each unit of time, where the first function icon corresponds to a first adjustable point among the plurality of adjustable points, and the first touch-input data includes a starting position, an ending position, and the unit of time required for the first function icon to move from the starting position to the ending position on the function interface; calculate a first updated coordinate of the first adjustable point corresponding to the first function icon based on the first touch-input data; and transmit the first updated coordinate to the projector. The projector is configured to: receive the first updated coordinate from the portable electronic device; and adjust the first adjustable point of the projected image to the first updated coordinate.

A projected image correction method of the disclosure is adapted for a projector and a portable electronic device. The projector is configured to project a projected image. The portable electronic device includes a processor and a touch-sensitive display. The portable electronic device is configured to be in communication connection with the projector. The projected image correction method includes: using the processor of the portable electronic device to execute an application to perform the following steps: activating the display to display a function interface, where the function interface includes a plurality of function icons; obtaining a plurality of original coordinates of a plurality of adjustable points corresponding to the projected image of the projector; arranging positions of the function icons on the function interface so that positional relationships of the function icons respectively correspond to positional relationships of the adjustable points in the projected image; in response to a first touch-drag operation on a first function icon among the plurality of function icons in the function interface, generating first touch-input data for each unit of time, where the first function icon corresponds to a first adjustable point among the plurality of adjustable points, and the first touch-input data includes a starting position, an ending position, and the unit of time required for the first function icon to move from the starting position to the ending position on the function interface; calculating a first updated coordinate of the first adjustable point corresponding to the first function icon based on the first touch-input data; and transmitting the first updated coordinate to the projector, so that the projector correspondingly adjusts the first adjustable point of the projected image to the first updated coordinate.

A non-transitory computer-readable recording medium of the disclosure records an application, where the processor in the portable electronic device executes the application to perform the above described projected image correction method.

Based on the above, the disclosure uses the touch-sensitive display to operate the function interface and thereby adjust the projected image. Accordingly, the correction process is simplified and accelerated, making the correction of the projected image more intuitive and efficient.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting.

Figure 1:
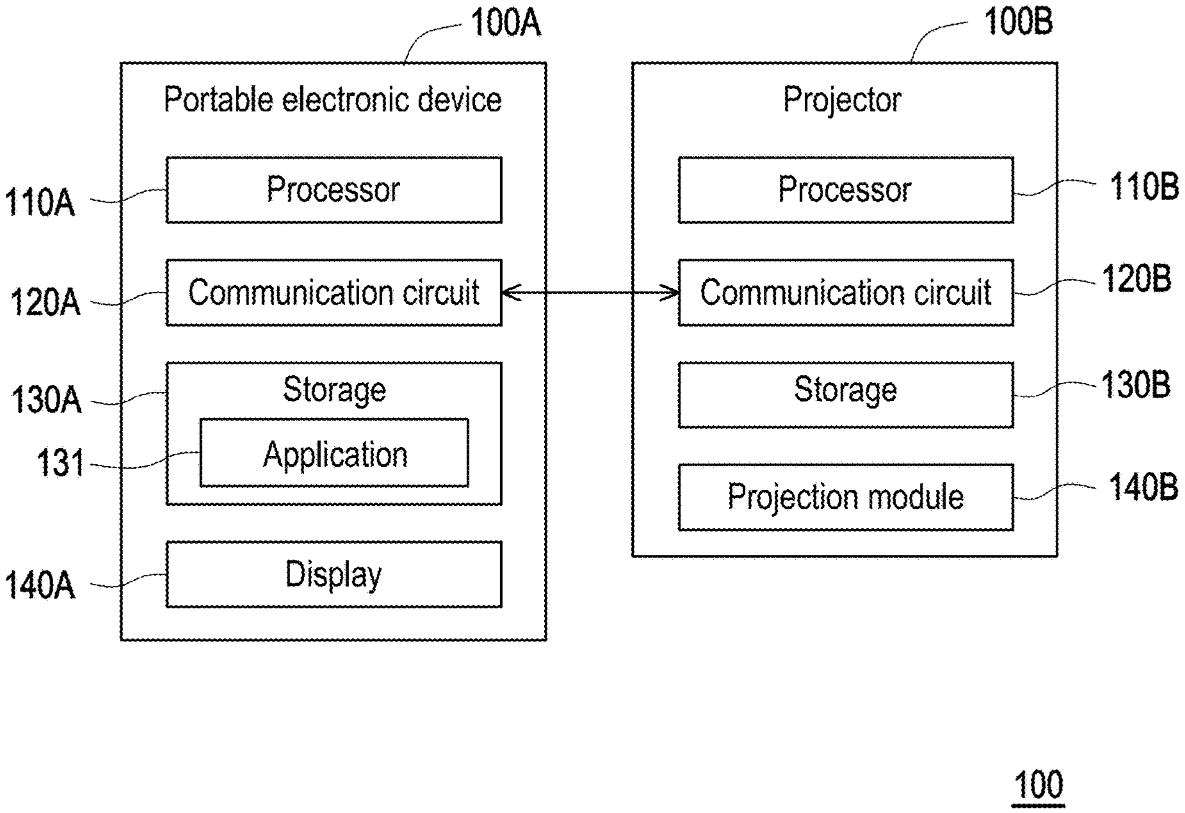
FIG. 1 is a block diagram of a projected image correction system according to an embodiment of the disclosure.

FIG. 1 is a block diagram of a projected image correction system according to an embodiment of the disclosure. Referring to FIG. 1, a projected image correction system 100 includes a portable electronic device 100A and a projector 100B. The portable electronic device 100A is communicatively connected with the projector 100B. The projector 100B is configured to project a projected image, and the portable electronic device 100A is configured to correct the projected image.

In this embodiment, the portable electronic device 100A includes a processor 110A and a touch-sensitive display 140A. The processor 110A is coupled to the touch-sensitive display 140A. Additionally, the portable electronic device 100A further includes a communication circuit 120A and a storage 130A. The processor 110A is coupled to the communication circuit 120A, the storage 130A, and the display 140A. The processor 110A may be one or more processors; however, for the sake of clarity, only one processor 110A is illustrated. It should be noted that the term "coupled" refers to, for example, an electrical signal connection.

The processor 110A may be implemented using a central processing unit (CPU), a physics processing unit (PPU), a programmable microprocessor, an embedded control chip, a digital signal processor (DSP), an application-specific integrated circuit (ASIC), or other similar devices. If the embodiment includes multiple processors 110A, a combination of the aforementioned devices may be employed.

The communication circuit 120A is configured to communicate with other devices or communication networks to transmit and receive signals through the network. The communication circuit 120A may be a Bluetooth transmission and reception device, a WiFi module, or a physical wired communication interface and/or a wireless communication interface. The wired communication interface may be implemented using a universal serial bus (USB) port, a general-purpose interface bus (GPIB) port, or a local area network (LAN) port. The wireless communication interface may be implemented using a wireless local area network (WLAN) interface, a cellular network communication interface, or a combination thereof.

The storage 130A may be any type of fixed or removable random access memory (RAM), read-only memory (ROM), flash memory, hard disk, other similar devices, or a combination thereof. The storage 130A may exist independently and be connected to the processor 110A via a communication bus, or the storage 130A may be integrated with the processor 110A. The storage 130A may include program code that is executed by the processor 110A. In this embodiment, the processor 110A executes the program code to run an application (APP) 131 accordingly.

In an embodiment, the storage 130A is a non-transitory computer-readable recording medium. The application 131 is stored in the non-transitory computer-readable recording medium. After reading the non-transitory computer-readable recording medium, the processor 110A in the portable electronic device 100A is configured to perform the projected image correction method as described later. The non-transitory computer-readable recording medium may be a read-only memory, a flash memory, a flexible disk, a hard disk, a compact disk, a pen drive (USB flash drive), a magnetic tape, a network-accessible database, or any other non-transitory computer-readable recording medium with similar functions that those skilled in the art can easily conceive.

In an embodiment, the application 131 may be a computer program product that includes at least one computer program or instruction. When downloaded and executed by a computer processor, the application 131 may perform the projected image correction method as described below.

The display 140A features touch-sensing function. The display 140A may be implemented using a liquid crystal display (LCD), a thin film transistor liquid crystal display (TFT-LCD), an organic light-emitting diode display (OLED display), a light-emitting diode display (LED display), an electroluminescent display (ELD), or other similar display technologies.

In this embodiment, the projector 100B includes a processor 110B and a projection module 140B. The processor 110B is coupled to the projection module 140B. Additionally, the projector 100B further includes a communication circuit 120B and a storage 130B. The processor 110B is coupled to the communication circuit 120B, the storage 130B, and the projection module 140B. The processor 110B may be one or more processors. However, for simplicity of explanation, only one processor 110B is shown here.

The processor 110B may be, for example, a digital data processor (DDP), such as an image processor model DLPC3436. This is provided as an example only, and the disclosure is not limited thereto. The processor 110B may also be implemented as a digital controller or similar component that enables the communication circuit 120B to communicate with other devices or communication networks to transmit and receive signals via the network. This may be achieved using a wired communication interface and/or a wireless communication interface, which may include a Bluetooth transmission and reception device, a WiFi module, or a physical wired communication interface and/or wireless communication interface. The wired communication interface may be implemented using a universal serial bus (USB) port, a general purpose interface bus (GPIB) port, or a local area network (LAN) port. The wireless communication interface may be implemented using a wireless local area network (WLAN) interface, a cellular network communication interface, or a combination thereof.

The storage 130B may be implemented similarly to the storage 130A. The storage 130B may exist independently and be connected to the processor 110B via a communication bus, or the storage 130B may be integrated with the processor 110B. The storage 130B may include program code that is executed by the processor 110B to drive (control) the projection module 140B to project the projected image.

The projection module 140B is configured to project image data received from the processor 110B out of the projector onto a projection target (such as a screen, tabletop, or wall, etc.) to form the projected image. The projection module 140B includes components such as an imaging element (e.g., a light valve), a projection lens, a light source, and optical elements that transmit light beams (e.g., reflectors, beam splitters, etc.). The light source may include, for example, a light-emitting diode (LED), a laser diode (LD), or a combination thereof. The imaging element (e.g., the light valve) may be a reflective light modulator such as a liquid crystal on silicon panel (LCoS panel), or a digital micro-mirror device (DMD). In some embodiments, the imaging element (e.g., the light valve) may also be a transmissive light modulator such as a transparent liquid crystal panel, an electro-optical modulator, a magneto-optic modulator, or an acousto-optic modulator (AOM).

The portable electronic device 100A and the projector 100B communicate via a wired or wireless communication protocol through the communication circuits 120A and 120B.

In the portable electronic device 100A, the display 140A is configured to receive the user's touch operation. The processor 110A generates touch-input data based on the touch operation, calculates correction information based on the touch-input data, and transmits the correction information to the projector 100B via the communication link between the communication circuit 120A and the communication circuit 120B.

In the projector 100B, the communication circuit 120B receives correction information from the portable electronic device 100A and provides the correction information to the processor 110B to correct the projected image. In one embodiment, the projector 100B is a smart projector with a built-in operating system. The smart projector not only includes an image processor for processing the projected image but also has an operating system processor dedicated to the operating system. In other words, the projector 100B has multiple processors 110B (an image processor and an operating system processor). The correction information received by the communication circuit 120B of the projector 100B is first sent to the operating system processor. The operating system processor defines the correction information as data readable by the image processor, and then forwards it to the image processor to correct the projected image. It should be noted that the projector 100B may not include an operating system processor. In such cases, the portable electronic device 100A may define the correction information as data readable by the image processor and then provide it directly to the image processor of the projector 100B.

Examples will now be provided to explain the implementation in detail.

Figure 2:
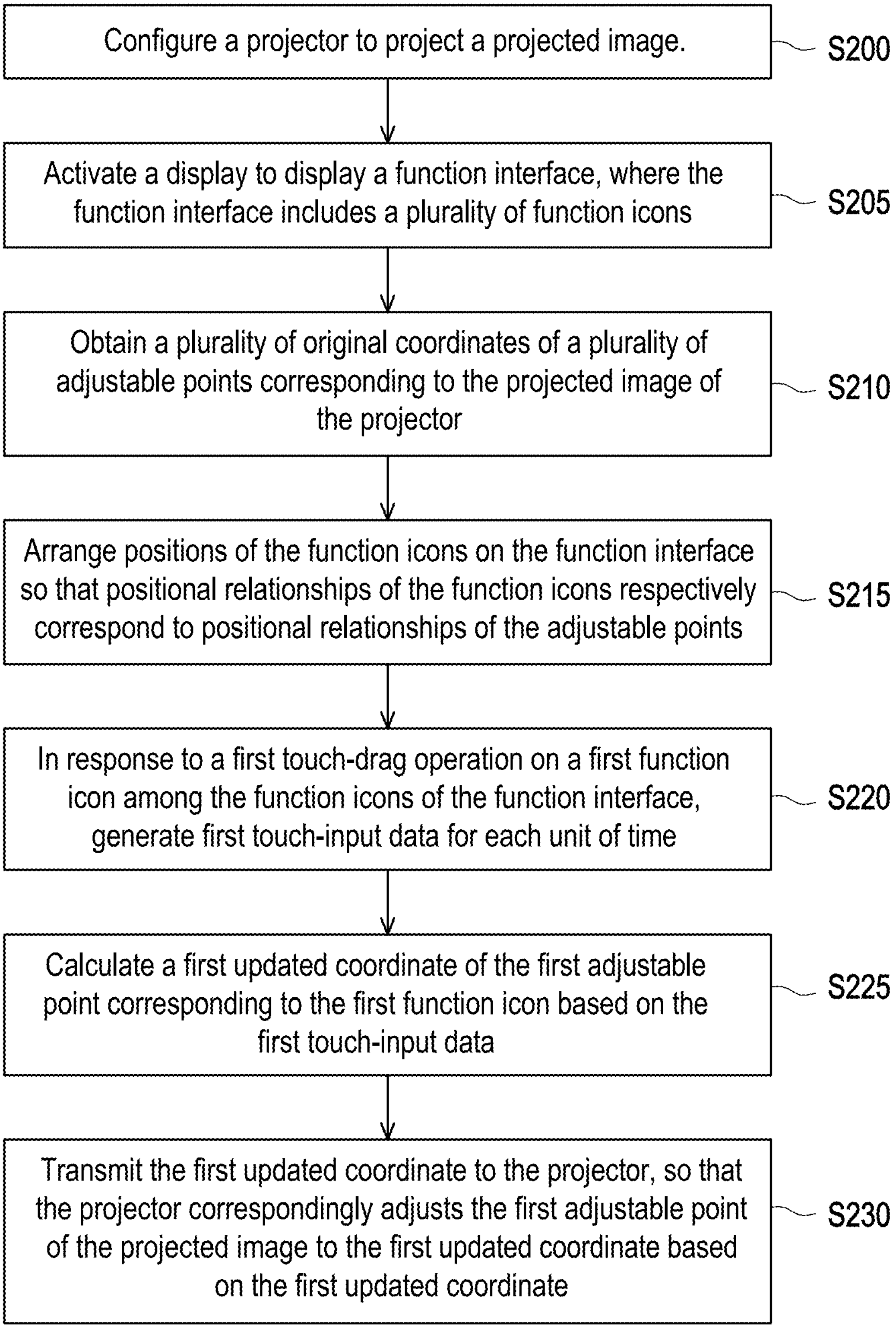
FIG. 2 is a flowchart of a projected image correction method according to an embodiment of the disclosure.
Figure 3:
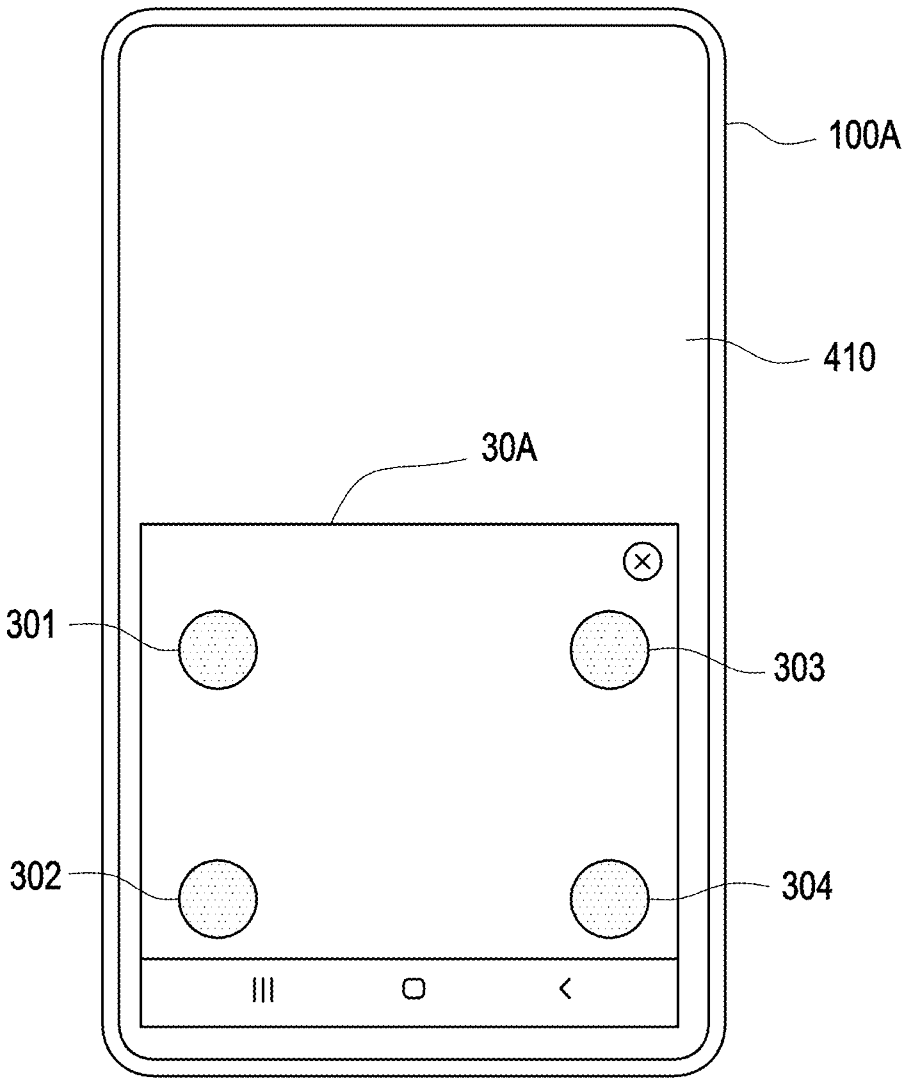
FIG. 3 is a schematic diagram of a function interface of a portable electronic device according to an embodiment of the disclosure.

FIG. 2 is a flowchart of a projected image correction method according to an embodiment of the disclosure. FIG. 3 is a schematic diagram of a function interface of a portable electronic device according to an embodiment of the disclosure. In this embodiment, the processor 110A of the portable electronic device 100A executes the application 131 to perform steps S205 to S230. For ease of explanation, steps S200 to S230 in FIG. 2 will be described below with reference to FIG. 3.

First, in step S200, the projector 100B is configured to project the projected image. Next, in step S205, the display 140A of the portable electronic device 100A displays a function interface 30A, wherein the function interface 30A includes a plurality of function icons 301 to 304, as shown in FIG. 3. In the embodiment shown in FIG. 3, the positional relationship among the function icons 301 to 304 on the function interface 30A respectively corresponds to the positional relationship among the adjustable points of the projected image. As shown in FIG. 3, the function icons 301 to 304 (upper-left icon, lower-left icon, upper-right icon, lower-right icon) located on the function interface 30A correspond respectively to the adjustable points of the four corners of the projected image (upper-left corner, lower-left corner, upper-right corner, lower-right corner). It can further be clearly defined that the plurality of function icons include a first function icon 301, a second function icon 302, a third function icon 303, and a fourth function icon 304. The first function icon 301 corresponds to a first adjustable point (upper-left corner) among the adjustable points, the second function icon 302 corresponds to a second adjustable point (lower-left corner) among the adjustable points, the third function icon 303 corresponds to a third adjustable point (upper-right corner) among the adjustable points, and the fourth function icon 304 corresponds to a fourth adjustable point (lower-right corner) among the adjustable points. Users may select the function icon corresponding to the corner they want to adjust through common selection methods such as long pressing or continuous double tapping. For example, if the user wants to adjust the upper-left corner of the projected image, they may press and hold the first function icon 301 in the function interface 30A, and then drag the first function icon 301 in the function interface 30A to adjust the projected image. It should be noted that the example of the first adjustable point corresponding to the first function icon 301 being the upper-left corner of the projected image is provided for illustration only and does not limit the first adjustable point to be exclusively the upper-left corner. The term "first function icon" is a general term and may correspond to other adjustable points as well. The descriptions of the second function icon 302, third function icon 303, and fourth function icon 304 follow the same logic and will not be repeated. Thus, in the following example, the first adjustable point corresponding to the first function icon 301 may be the upper-left corner of the projected image, the second adjustable point corresponding to the second function icon 302 may be the lower-left corner of the projected image, the third adjustable point corresponding to the third function icon 303 may be the upper-right corner of the projected image, and the fourth adjustable point corresponding to the fourth function icon 304 may be the lower-right corner of the projected image.

Figure 4:
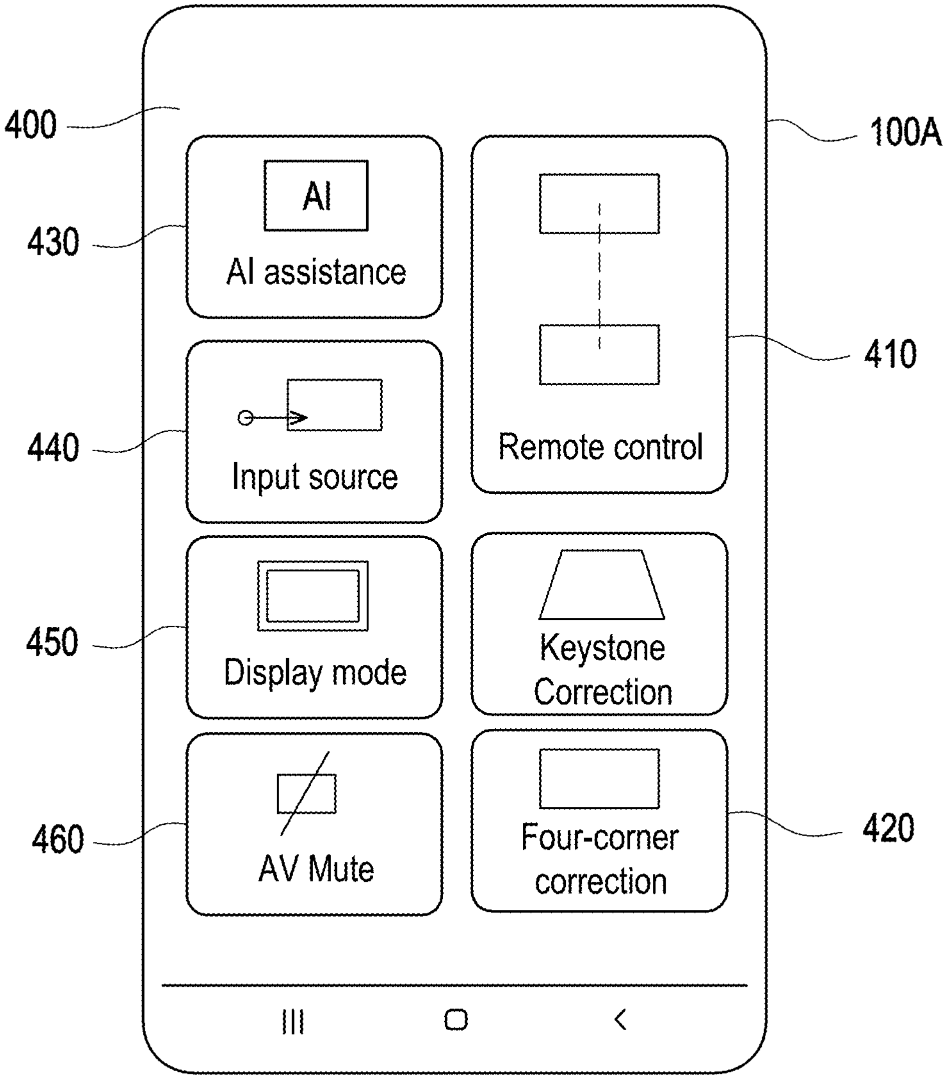
FIG. 4 is a schematic diagram of a user interface of a portable electronic device according to an embodiment of the disclosure.

In one embodiment, when the application 131 is executed, the display 140A of the portable electronic device 100A displays a user interface. The user interface includes a plurality of icons, and in response to one of the icons being selected, the function interface corresponding to the selected icon is displayed. Specifically, when the application 131 is executed, the display 140A of the portable electronic device 100A may display the user interface. The user may select the icon corresponding to the four-corner correction in the user interface to display the four-corner correction function interface 30A. For ease of explanation, FIG. 4 is a schematic diagram of a user interface of a portable electronic device according to an embodiment of the disclosure. Referring to FIG. 1 and FIG. 4, when the processor 110A of the portable electronic device 100A executes the application 131, a user interface 400 corresponding to the projector 100B is displayed on the display 140A of the portable electronic device 100A. As shown in FIG. 4, the user interface 400 includes six icons 410 to 460, but the disclosure is not limited thereto.

The icon 410 corresponds to the remote control function. After the user selects icon 410, a function interface corresponding to the remote control function is displayed via the display 140A, and the projector 100B can be remotely controlled through this function interface. The icon 420 corresponds to the function interface for the four-corner correction function (e.g., providing a function corresponding to correcting the four corners of the projected image). After the user selects icon 420, the four-corner correction of the projected image is performed through this function interface. The icon 430 corresponds to the function interface for the artificial intelligence (AI) auxiliary function. After the user selects icon 430, the user may perform voice input and communicate with the AI model through this function interface. The icon 440 corresponds to the function interface for the input source function. After the user selects icon 440, the input source of the projected image of the projector 100B is switched through this function interface. The icon 450 corresponds to the function interface for the display mode function. After the user selects icon 450, the display mode of the projected image of the projector 100B can be switched through this function interface. For example, the display mode may include a mirror/synchronous display mode or a non-mirror/extended desktop display mode. The icon 460 corresponds to the AV (audio-video) mute function. After the user selects icon 460, selecting the icon 460 may temporarily turn off the projector 100B to stop projecting the projected image and temporarily stop the projector 100B from outputting the corresponding sound. Selecting icon 460 again may immediately prompt the projector 100B to resume projecting the projected image and continue outputting the corresponding sound.

The user may select icon 420 in the user interface 400. In response to the selection of icon 420, the processor 110A executes the application 131 to display the function interface 30A corresponding to icon 420.

Returning to FIG. 2, in step S210, a plurality of original coordinates of a plurality of adjustable points corresponding to the projected image of the projector 100B are obtained. Furthermore, in step S215, the positions of the first function icon 301 to the fourth function icon 304 in FIG. 3 on the function interface 30A is arranged so that the positional relationships of the first function icon 301 to the fourth function icon 304 respectively correspond to the positional relationships of the plurality of adjustable points of the projected image. The plurality of original coordinates of the adjustable points in the projected image are, for example, the coordinates of the projection coordinate system of the projector. For example, as mentioned above, the adjustable points of the projected image include the four corner positions of the projected image, namely the upper-left corner, lower-left corner, upper-right corner, and lower-right corner.

When the application 131 of the portable electronic device 100A is opened, the portable electronic device 100A may establish a connection with the projector 100B. The portable electronic device 100A will notify the projector 100B so that the projector 100B provides the projector coordinate system (original coordinates) of the four corners (four adjustable points) of the currently projected image to the portable electronic device 100A according to the access information of the portable electronic device 100A (requesting the original coordinates of the plurality of adjustable points). The portable electronic device 100A may then obtain the four original coordinates corresponding to the four corners of the projected image within the projector coordinate system. For example, referring to the function interface 30A in FIG. 3, the coordinates of the first function icon 301 located in the upper-left corner of the function interface 30A correspond to the original coordinates of the upper-left corner of the projected image, and so on.

In step S220, in response to a first touch-drag operation on the first function icon 301 among the first function icon 301 to the fourth function icon 304 in the function interface 30A, first touch-input data is generated per unit of time. Here, the first function icon 301 corresponds to the first adjustable point among the plurality of adjustable points in the projected image. The first touch-input data includes the starting position and ending position of the first function icon 301 on the function interface 30A and the unit of time required for the first function icon 301 to move from the starting position to the ending position.

For example, the first touch-drag operation (hereinafter referred to as the touch-drag operation for simplicity) may be performed as follows: the user may use a finger or a stylus to touch the first function icon 301 on the function interface displayed by the display 140A, and while continuing to touch the first function icon 301, drag it from the preset original position to the desired position. During the dragging process of the first function icon 301, touch-input data (i.e., the first touch-input data) is generated at each unit of time until the dragging ends. It should be noted that if the time interval between the end of the dragging operation and the last recorded touch-input data does not reach a full unit of time, no touch-input data will be generated. In response to the end of the first touch-drag operation (when the user's finger or stylus stops touching the first function icon 301), the processor 110A generates the first final touch-input data. The first final touch-input data includes the touch stop position of the first function icon 301 on the function interface 30A.

Specifically, the operation time of the first touch-drag operation sequentially includes a plurality of unit of times, and the starting position of the first touch-input data corresponding to the first unit of time among the plurality of unit of times is the preset original position of the first function icon 301 on the function interface 30A. Among the two adjacent unit of times in these unit of times, the ending position of the first touch-input data corresponding to a previous unit of time is used as the starting position of the first touch-input data corresponding to a subsequent unit of time.

For example, assuming that an unit of time is 200 milliseconds (ms) and the total drag time is 500 ms, when the dragging reaches 200 ms, touch-input data corresponding to one unit of time (0 to 200 milliseconds) is generated. This touch-input data includes the position of the first function icon 301 at 0 seconds (starting position, i.e., the moment when the first function icon 301 starts being dragged) and the position of the first function icon 301 being dragged to at the 200th millisecond (ending position). When the first function icon 301 is continuously dragged for another 200 milliseconds, touch-input data corresponding to one unit of time (200 to 400 milliseconds) is generated. This touch-input data includes the position of the first function icon 301 at the 200th ms (starting position) and the position of the first function icon 301 being dragged to at the 400th ms (ending position). After that, if the first function icon 301 is continuously dragged and the dragging operation ends after an additional 100 milliseconds, since 100 ms is less than one unit of time (200 ms), no touch-input data corresponding to the 400 to 500 ms is generated. That is to say, the first final touch-input data includes the position of the first function icon 301 at the 200th millisecond (starting position) and the touch stop position (ending position) of the first function icon 301 after being dragged to at the 400th millisecond when the dragging operation is completed.

In an embodiment, the first touch-input data further includes the movement direction of the first function icon 301 during the corresponding unit of time and the movement trajectory of the first function icon 301 during the corresponding unit of time. For example, while the first function icon 301 is being dragged, the upper-left corner of the projected image projected by the projector 100B may change according to the movement direction and movement trajectory.

In step S225, based on the first touch-input data, a first updated coordinate of the first adjustable point corresponding to the first function icon 301 is calculated (hereinafter referred to as the updated coordinate for simplicity). Furthermore, in step S230, the first updated coordinate is transmitted to the projector 100B, so that the projector 100B correspondingly adjusts the first adjustable point of the projected image to the first updated coordinate.

For example, in the case where the portable electronic device 100A transmits the updated coordinate to the projector 100B every 200 milliseconds (the unit of time is set to 200 milliseconds), taking the first function icon 301 and the total drag time of 500 milliseconds as an example, when the first function icon 301 is touched and dragged for 200 milliseconds, the processor 110A generates the touch-input data corresponding to the first unit of time (0 to 200 milliseconds), which includes the coordinate (x0, y0) of the starting position of the first function icon, the coordinate (x1, y1) of the ending position, and the corresponding unit of time 0 to 200 milliseconds. The processor 110A calculates the first updated coordinate ($P1_{X1}$, $P1_{Y1}$) of the first adjustable point in the first unit of time based on the coordinate (x0, y0) and coordinate (x1, y1), along with the original coordinate ($P1_{X0}$, $P1_{Y0}$) of the first adjustable point (upper-left corner) of the projected image in the projection coordinate system. Afterwards, the processor 110A transmits the first updated coordinate ($P1_{X1}$, $P1_{Y1}$) to the projector 100B. After the projector 100B receives the first updated coordinate ($P1_{X1}$, $P1_{Y1}$) from the portable electronic device 100A, the processor 110B of the projector 100B compensates the image data corresponding to the projected image according to the first updated coordinate ($P1_{X1}$, $P1_{Y1}$). Therefore, the initial position of the first adjustable point in the upper-left corner of the projected image is adjusted to the first updated coordinate ($P1_{X1}$, $P1_{Y1}$), and the user may see the corresponding movement of the projected image on the projection surface in real time.

Then, when the first function icon 301 is continuously dragged for another 200 milliseconds, at the time point of 400 milliseconds, the processor 110A generates the touch-input data corresponding to the second unit of time (200 to 400 milliseconds), which includes the coordinate of the starting position (x1, y1), the coordinate of the ending position (x2, y2), and the corresponding unit of time 200 to 400 milliseconds. Based on the coordinate (x1, y1) and coordinate (x2, y2) and the first adjustable point in the upper-left corner of the corresponding projected image (the updated first updated coordinate ($P1_{X1}$, $P1_{Y1}$)), the processor 110A calculates the new first updated coordinate ($P1_{X2}$, $P1_{Y2}$) in the second unit of time. Afterwards, the processor 110A transmits the first updated coordinate ($P1_{X2}$, $P1_{Y2}$) to the projector 100B. After receiving the first updated coordinate ($P1_{X2}$, $P1_{Y2}$) from the portable electronic device 100A, the projector 100B adjusts the first adjustable point corresponding to the upper-left corner of the projected image from the first updated coordinate ($P1_{X1}$, $P1_{Y1}$) to the new first updated coordinate ($P1_{X2}$, $P1_{Y2}$).

Afterwards, when the first function icon 301 is continuously dragged and the dragging is completed after 100 ms, at the time point when the dragging ends, since 100 ms is less than the unit of time of 200 ms, the touch-input data corresponding to 400 ms to 500 ms will not be generated. Therefore, the data generated by the processor 110A corresponding to 200 ms to 400 ms is the first final touch-input data, which includes the coordinate of the starting position (x1, y1), the coordinate of the touch stop position (ending position) (x2, y2), and the corresponding time 200 to 400 ms. Based on the coordinate (x1, y1) and coordinate (x2, y2) and the first adjustable point corresponding to the upper left corner of the projected image (the updated first updated coordinate ($P1_{X1}$, $P1_{Y1}$)), the processor 110A calculates the first final updated coordinate ($P1_{X2}$, $P1_{Y2}$) corresponding to the first adjustable point of the first function icon 301.

Afterwards, the processor 110A transmits the first final updated coordinate ($P1_{X2}$, $P1_{Y2}$) to the projector 100B. After receiving the first final updated coordinate ($P1_{X2}$, $P1_{Y2}$) from portable electronic device 100A, the projector 100B adjusts the first adjustable point (upper left corner) of the corresponding projected image from the first updated coordinate ($P1_{X1}$, $P1_{Y1}$) to the first final updated coordinate ($P1_{X2}$, $P1_{Y2}$).

In an embodiment, in response to the end of the first touch-drag operation, the processor 110A sets the touch stop position of the first function icon 301 as the starting position for the next first touch-drag operation. That is, after the first touch-drag operation is completed, the position of the first function icon 301 will remain at the touch stop position. Alternatively, in another embodiment, the processor 110A may move the first function icon 301 from the touch stop position back to the preset original position in response to the end of the first touch-drag operation. That is, visually, the first function icon 301 in the function interface 30A has the function of returning to the preset original position after completing the drag operation. The functions of the second function icon 302 to the fourth function icon 304 are the same as those of the first function icon 301; therefore, a detailed description thereof will be omitted.

In an embodiment, the developer of the application 131 may set the corresponding relationship between a first distance unit moved by each function icon in the function interface 30A and a second distance unit moved by the adjustable point based on user experience. For example, while the first distance unit that the function icon moves is N pixels, the distance unit that the adjustable point moves is 1 centimeter. The developer of the application 131 may set the application 131 such that when the function icon moves by 1 first distance unit, the corresponding adjustable point may move by 0.5 second distance units or 2 second distance units. Alternatively, the developer of the application 131 may set the application 131 such that the function icon moves by 1 first distance unit, and the corresponding adjustable point moves by 1 second distance unit. That is to say, the developer of the application 131 may configure the application such that the function icon moves a first distance units, and the corresponding adjustable point moves b second distance units, where a and b are positive integers greater than zero. The values of a and b may be the same or different. It should be noted that the values of a and b can be adjusted arbitrarily and are not limited to specific values.

Additionally, in response to the end of the first touch-drag operation (when the finger or stylus stops touching the first function icon 301), the processor 110A of the portable electronic device 100A will again request the projector 100B to provide the four updated coordinates of the four corner positions of the projected image 510 in the projector coordinate system. Accordingly, the corresponding relationship between the first function icon 301 to the fourth function icon 304 and the coordinates of the adjustable points is updated.

A plurality of embodiments are listed below for further explanation.

Figure 5A:
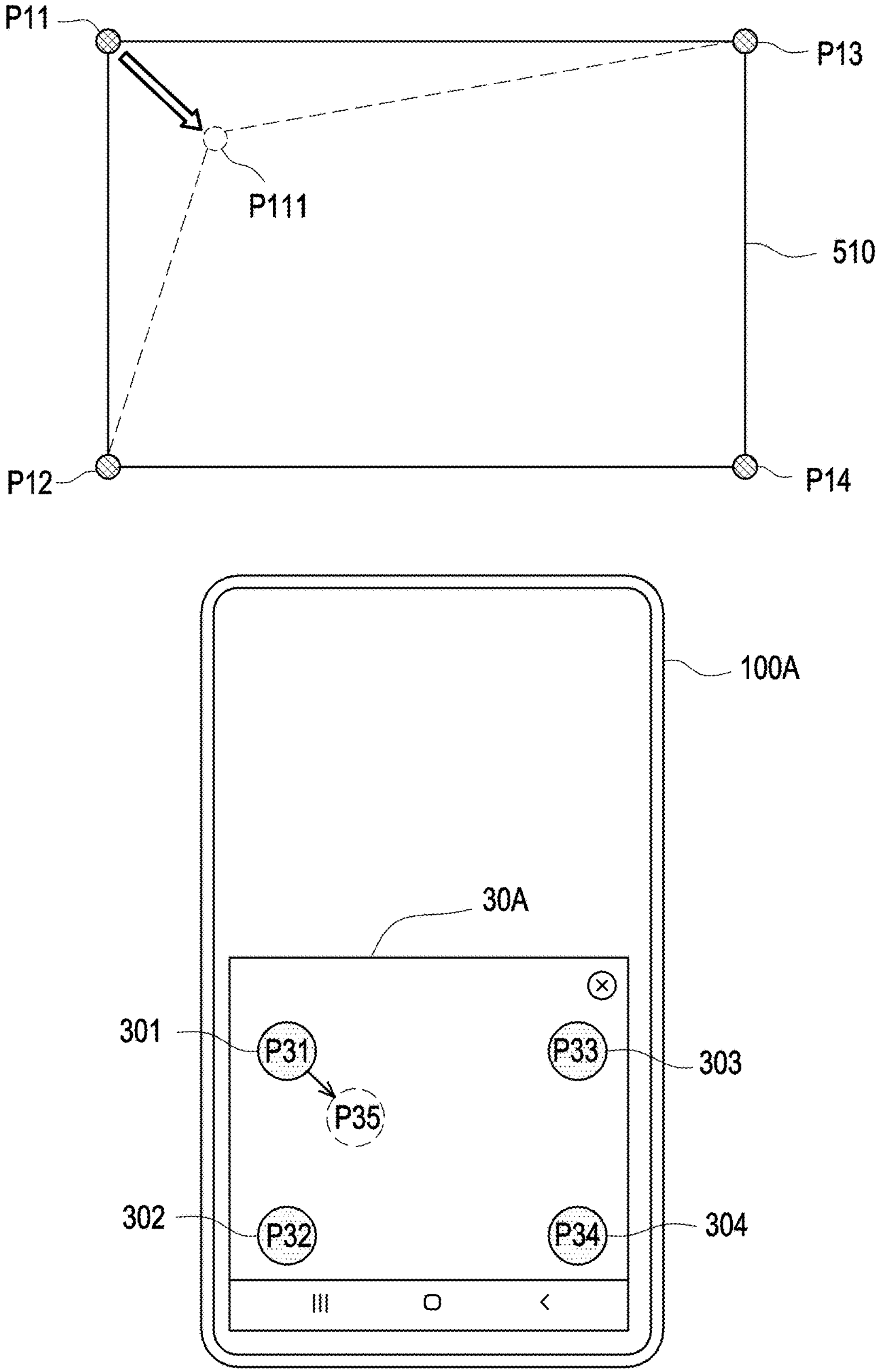
FIG. 5A and FIG. 5B are schematic diagrams illustrating changes in the operation of a function interface relative to a projected image according to an embodiment of the disclosure.
Figure 5B:
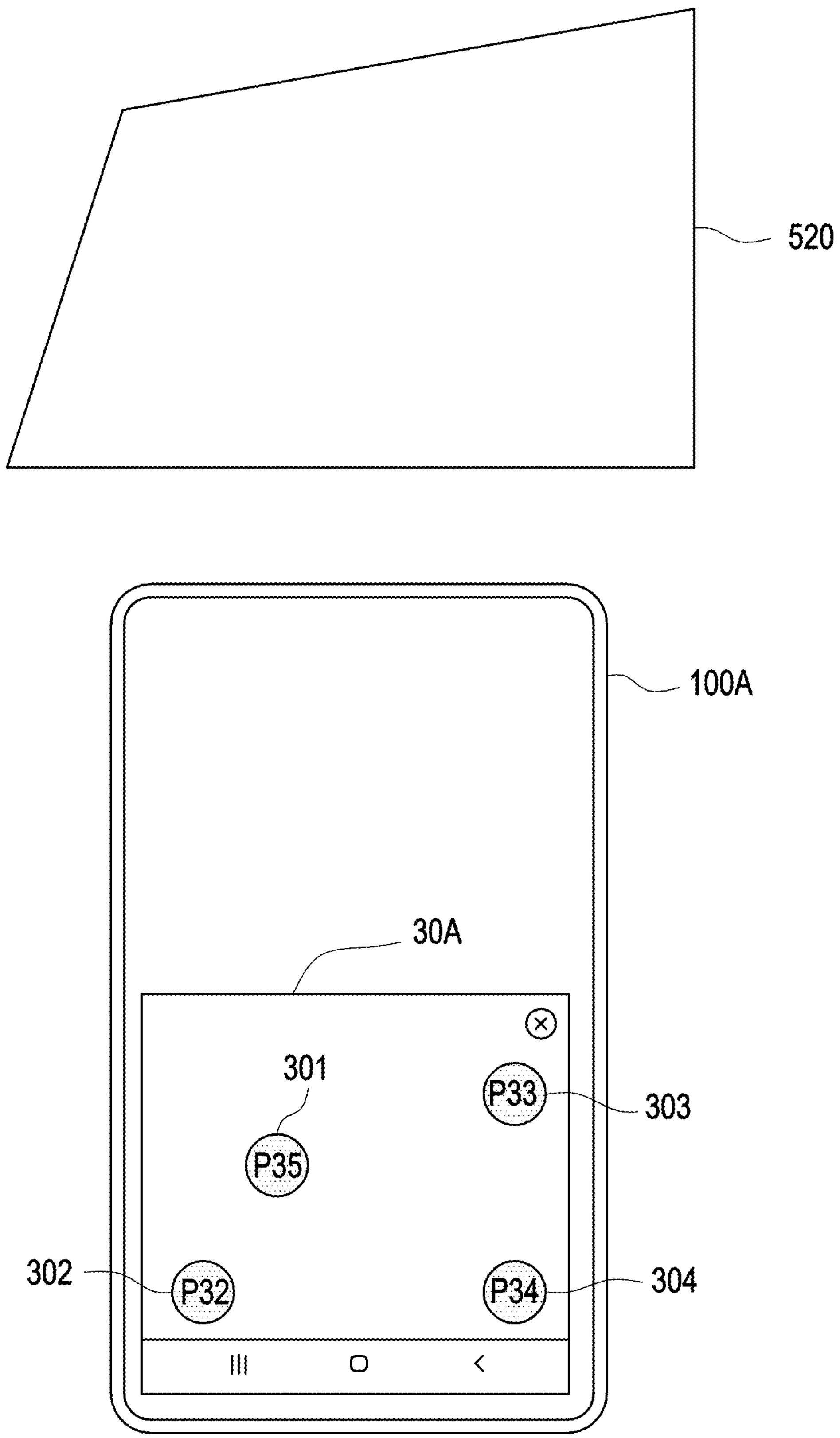

FIG. 5A and FIG. 5B are schematic diagrams illustrating changes in the operation of a function interface relative to a projected image according to an embodiment of the disclosure. In FIG. 5A and FIG. 5B, the function interface 30A includes the first function icon 301 to the fourth function icon 304. The preset original positions of the first function icon 301 to the fourth function icon 304 are designated as positions P31 to P34.

The portable electronic device 100A opens the application 131 and connects with the projector 100B. The projector 100B may be turned on either by the user or controlled by the portable electronic device 100A to turn on, allowing the projector 100B to project the projected image 510. The portable electronic device 100A may request the projector 100B, via the application 131, to provide the four corner positions of the projected image 510 in the form of four original coordinates in the projector coordinate system (the coordinates of the four corners of the rectangle built into the projector 100B). The portable electronic device 100A may then record the corresponding relationship between the four original coordinates and the positions P31 to P34. As shown in FIG. 5A, the projector 100B projects the projected image 510 based on the four original coordinates of the projector coordinate system, where the four corner positions (four adjustable points) of the projected image 510 are identified as projection positions P11 to P14 respectively.

In FIG. 5A, the user chooses to perform a touch-drag operation on the first function icon 301 and drags the first function icon 301 from position P31 to position P35. The processor 110A, through the application 131, calculates the change between the coordinate (AX1, AY1) of position P31 and the coordinate (AX1', AY1') of position P35. The processor 110A then calculates the updated coordinate (X1', Y1') based on the calculated change, the dragged movement direction of the first function icon 301, and the original coordinate (X1, Y1) of the projected position P11 corresponding to position P31. The processor 110A transmits the updated coordinate (X1', Y1') and the original coordinate (X1, Y1) corresponding to the first function icon 301 to the projector 100B. As a result, the projector 100B adjusts the position of the adjustable point corresponding to the upper-left corner of the projected image 520 to the projection position P111, which corresponds to the updated coordinate (X1', Y1'). Consequently, the projected image 520 shown in FIG. 5B is obtained, and the user may observe the corresponding movement from an upper-left position to the projected position P111 in the projected image 520 in real time.

In FIG. 5B, in response to the end of the touch-drag operation of the first function icon 301, the processor 110A keeps the first function icon 301 at the touch stop position at the end of the touch-drag operation, which is position P35.

Additionally, in this embodiment, regardless of whether the current projected image 510 is skewed or rectangular, the first function icon 301 to the fourth function icon 304 in the function interface 30A on the display 140A of the portable electronic device 100A are initially presented in a rectangular configuration at the four corners.

Figure 6A:
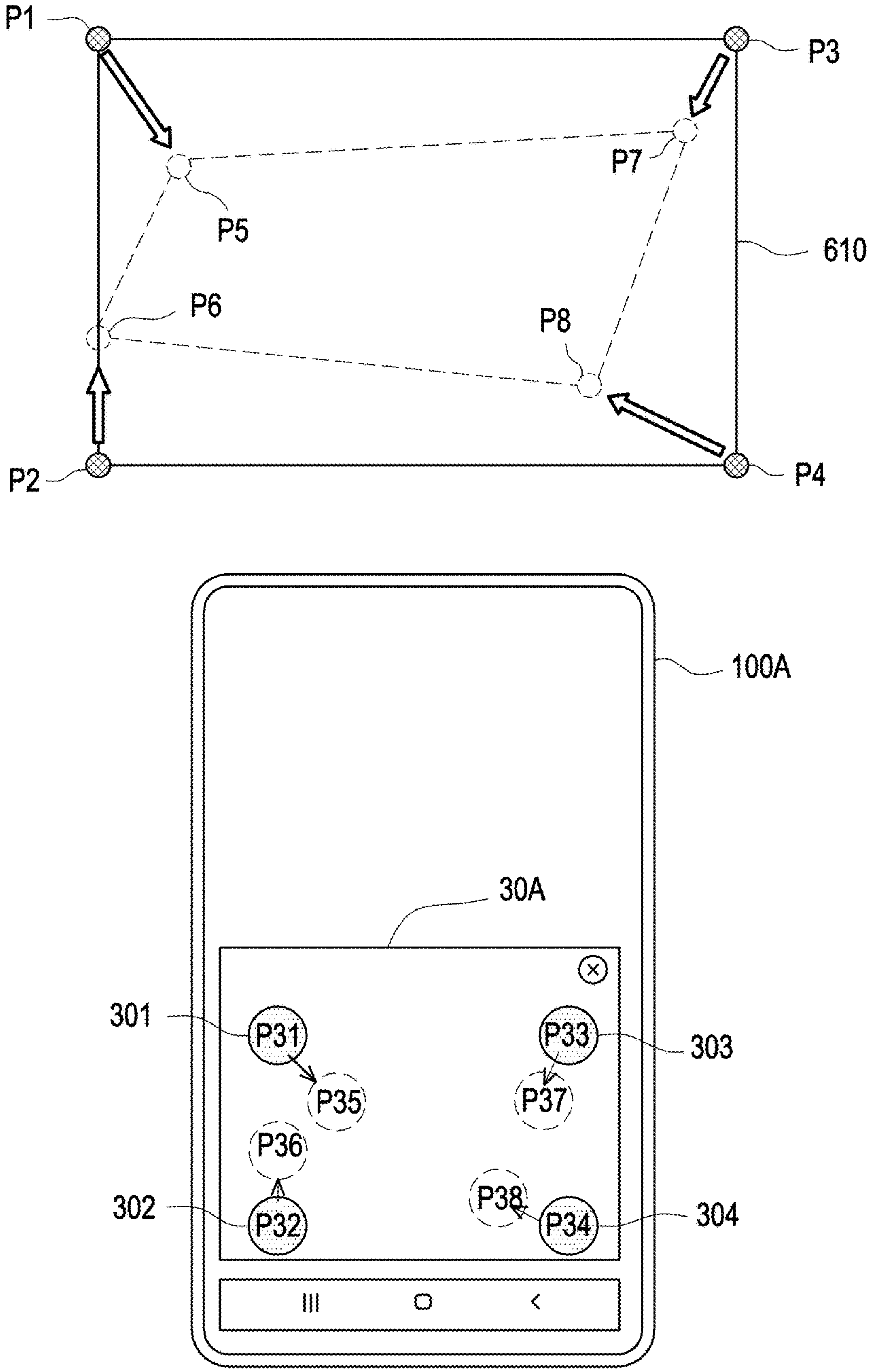
FIG. 6A and FIG. 6B are schematic diagrams illustrating changes in the operation of a function interface relative to a projected image according to an embodiment of the disclosure.
Figure 6B:
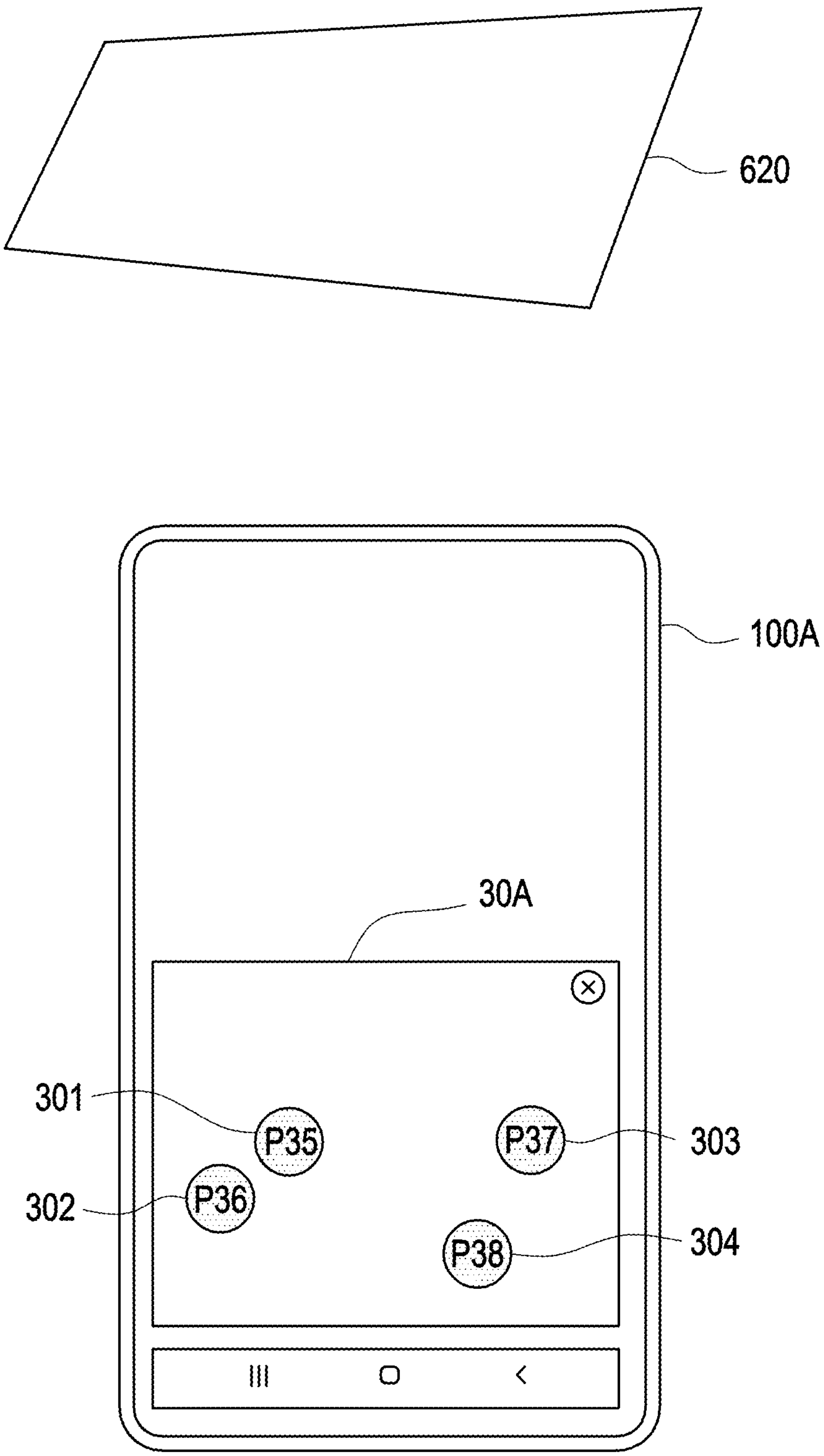

FIG. 6A and FIG. 6B are schematic diagrams illustrating changes in the operation of a function interface relative to a projected image according to an embodiment of the disclosure. As shown in FIG. 6A, the projector 100B projects a projected image 610 based on the four original coordinates of the projector coordinate system, where the four adjustable points of the projected image 610 correspond to the projection positions P1 to P4 respectively.

The user sequentially drags the first function icon 301 from position P31 to position P35, the second function icon 302 from position P32 to position P36, the third function icon 303 from position P33 to position P37, and the fourth function icon 304 from position P34 to position P38 using the portable electronic device 100A. Through the application 131, the processor 110A sequentially calculates the changes between positions P31 to P34 and positions P35 to P38, thereby calculating the four updated coordinates. The projector 100B then sequentially projects the four corners of the projected image 610 to the corresponding updated coordinates. That is, visually, the four adjustable points of the projected image 610 may move from projection position P1 to projection position P5 in accordance with the drag sequence, allowing the user to see the projection position P1 in the projected image 610 move to projection position P5 in real time. Similarly, the projection position P2 may move to projection position P6, the projection position P3 may move to projection position P7, and the projection position P4 may move to projection position P8, with the user being able to see these corresponding movements in real time. Finally, the adjusted projected image 620 is obtained.

In FIG. 6B, in response to the completion of the touch-drag operation of the first function icon 301 to the fourth function icon 304, the processor 110A keeps the positions of the first function icon 301 to the fourth function icon 304 at the touch stop positions when the touch-drag operation ends, which are positions P35 to P38 respectively.

Figure 7A:
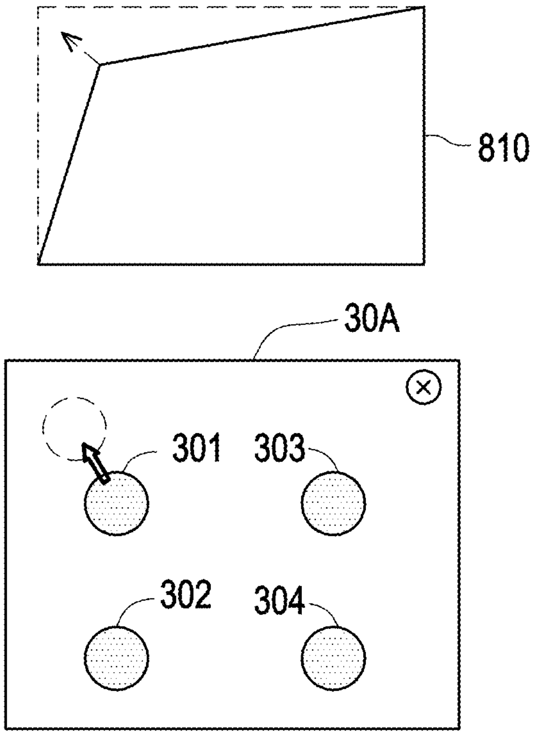
FIG. 7A and FIG. 7B are schematic diagrams illustrating changes in the operation of a function interface relative to a projected image according to an embodiment of the disclosure.
Figure 7B:
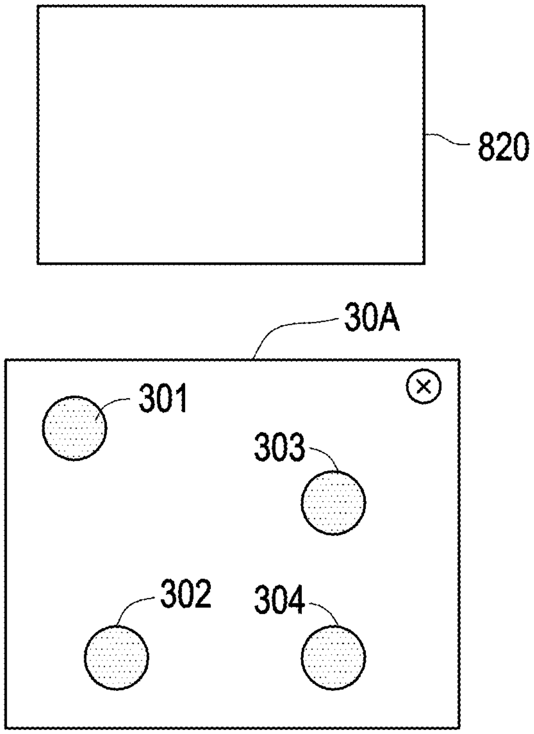

FIG. 7A and FIG. 7B are schematic diagrams illustrating changes in the operation of a function interface relative to a projected image according to an embodiment of the disclosure. In FIG. 7A, since the current projected image 810 may not initially be rectangular (for example, if the projector is not properly aligned), it should be noted that the first function icon 301 to the fourth function icon 304 in the four corners of the function interface 30A on the display 140A of the portable electronic device 100A are still initially presented in a rectangular configuration at the four corners.

When the user performs a touch-drag operation on the first function icon 301, the position of the upper-left corner of the projected image 810 will change based on the movement trajectory of the touch-drag operation. The user may see the corresponding movement of the projected image in real time, ultimately resulting in the projected image 820 as shown in FIG. 7B. In FIG. 7B, in response to the end of the touch-drag operation of the first function icon 301, the processor 110A keeps the position of the first function icon 301 at the touch stop position when the touch-drag operation ends.

Figure 8A:
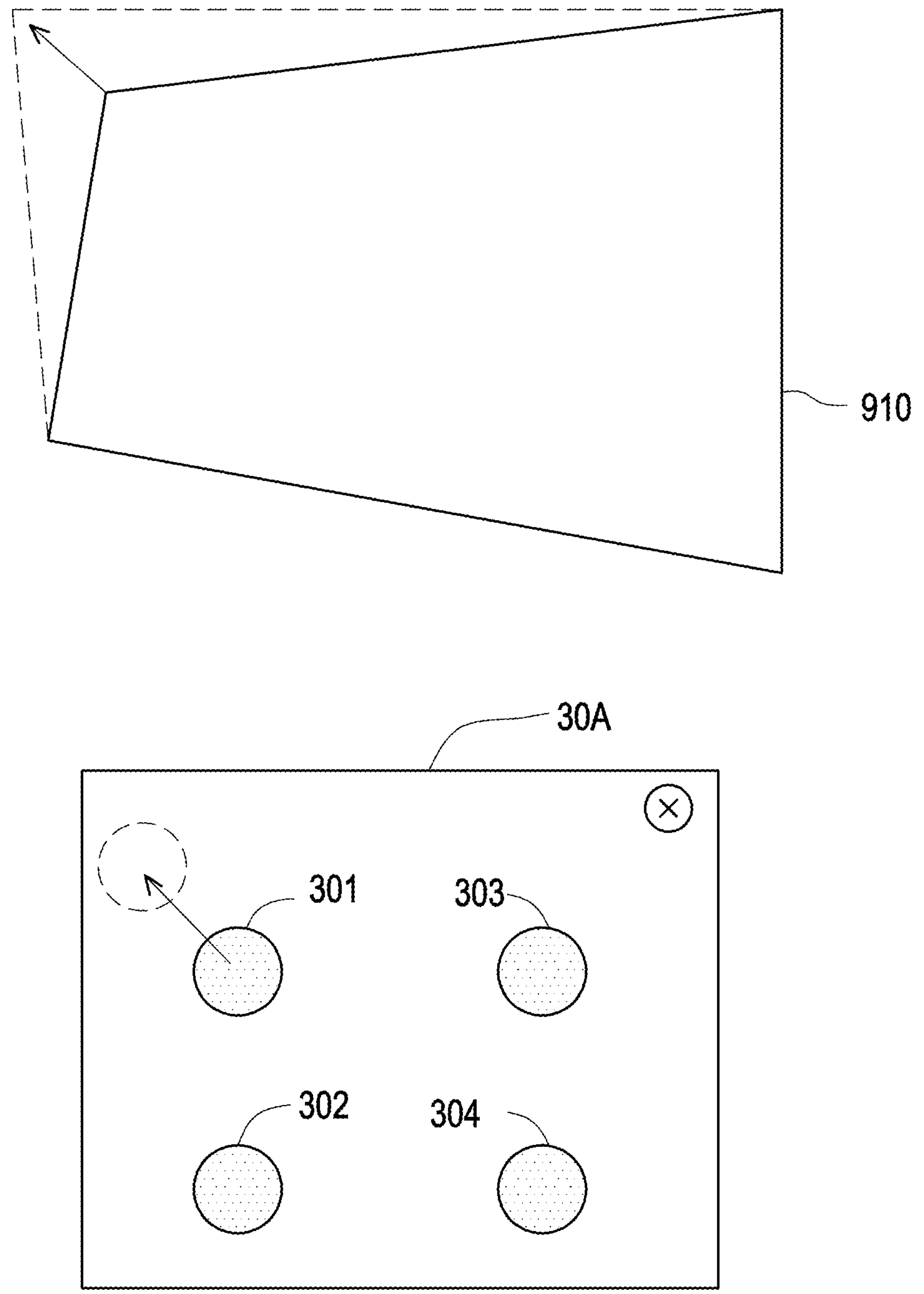
FIG. 8A to FIG. 8C are schematic diagrams illustrating changes in the operation of a function interface relative to a projected image according to an embodiment of the disclosure.
Figure 8B:
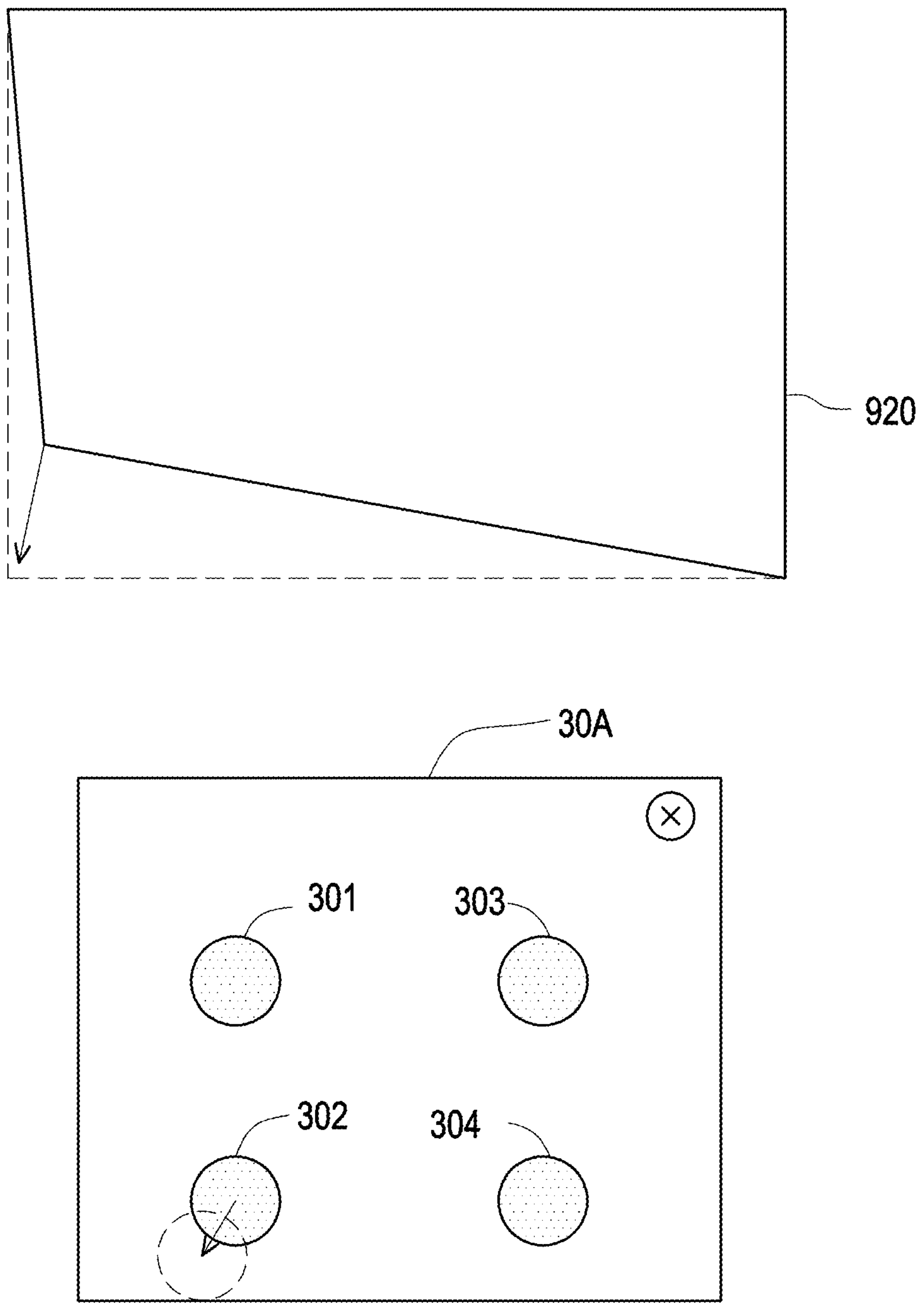
Figure 8C:
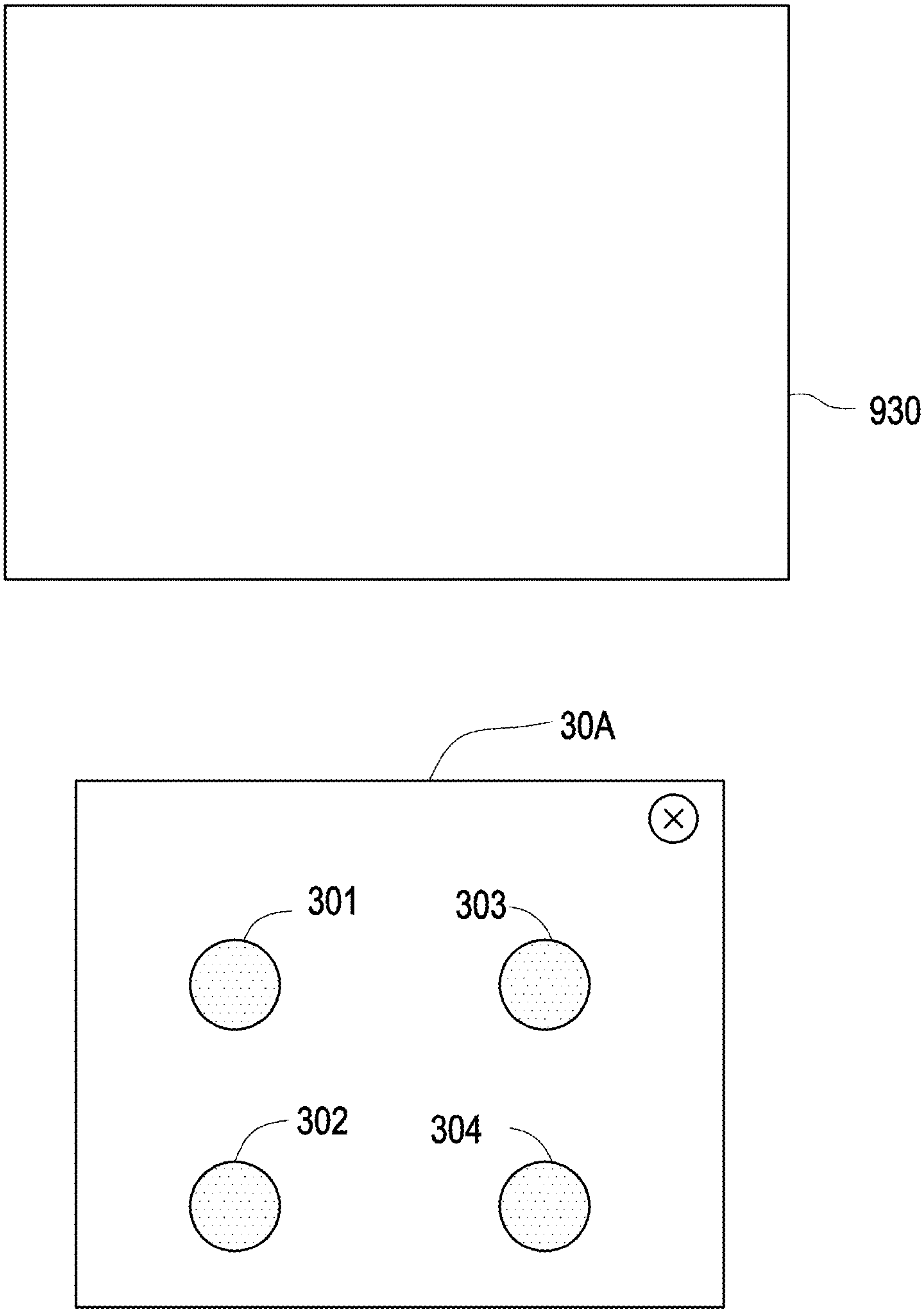

FIG. 8A to FIG. 8C are schematic diagrams illustrating changes in the operation of a function interface relative to a projected image according to an embodiment of the disclosure. In this embodiment, the dragged function icon will return to the preset original position. Even if the current projected image 910 is not rectangular, the first function icon 301 to the fourth function icon 304 in the four corners of the function interface 30A on the display 140A of the portable electronic device 100A are still initially presented in a rectangular configuration at the four corners.

When the user performs a touch-drag operation on the first function icon 301, the position of the upper-left corner of the projected image 910 will change based on the movement trajectory of the touch-drag operation. The user may see the corresponding movement of the upper-left corner of the projected image 910 in real time, ultimately resulting in the projected image 920 as shown in FIG. 8B. In FIG. 8B, in response to the end of the touch-drag operation of the first function icon 301, the processor 110A moves the position of the first function icon 301 from the touch stop position back to the preset original position.

Next, when the user performs a touch-drag operation on the second function icon 302, the position of the lower-left corner of the projected image 920 will also change based on the movement trajectory of the touch-drag operation. The user may see the corresponding movement of the lower-left corner of the projected image 920 in real time, ultimately resulting in the projected image 930 as shown in FIG. 8C. In FIG. 8C, in response to the end of the touch-drag operation of the second function icon 302, the processor 110A moves the position of the second function icon 302 from the touch stop position back to the preset original position.

Figure 9A:
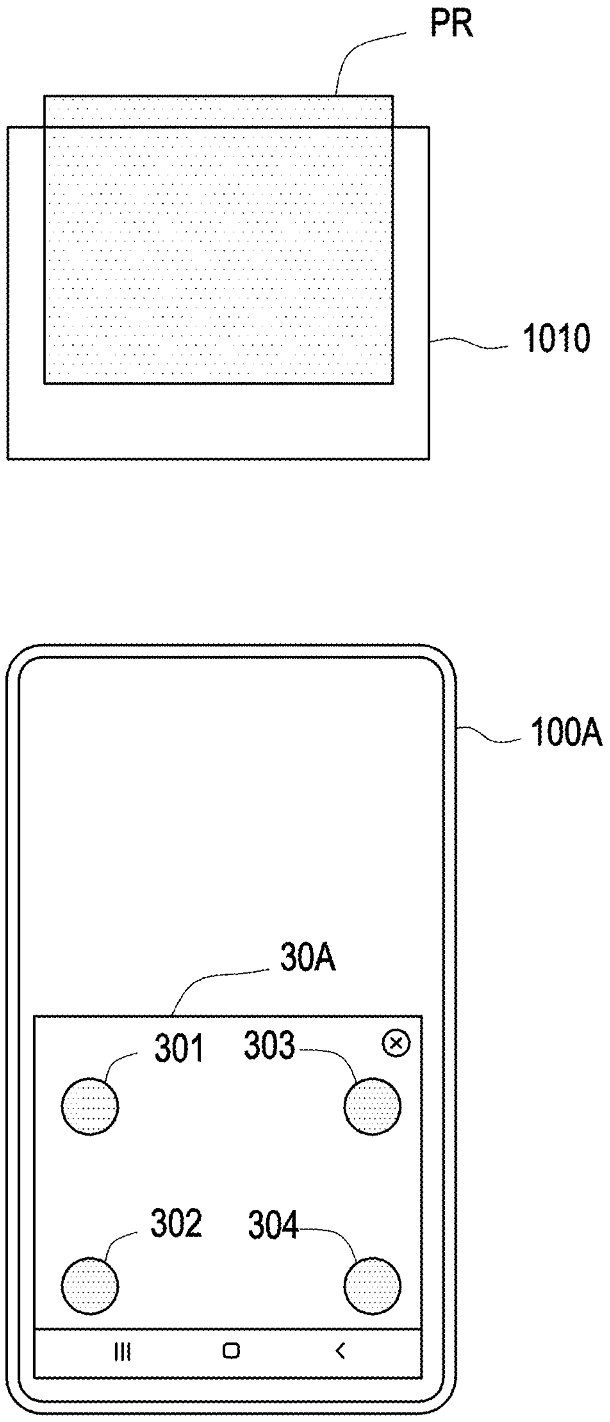
FIG. 9A and FIG. 9B are schematic diagrams illustrating changes in the operation of a function interface relative to a projected image according to an embodiment of the disclosure.
Figure 9B:
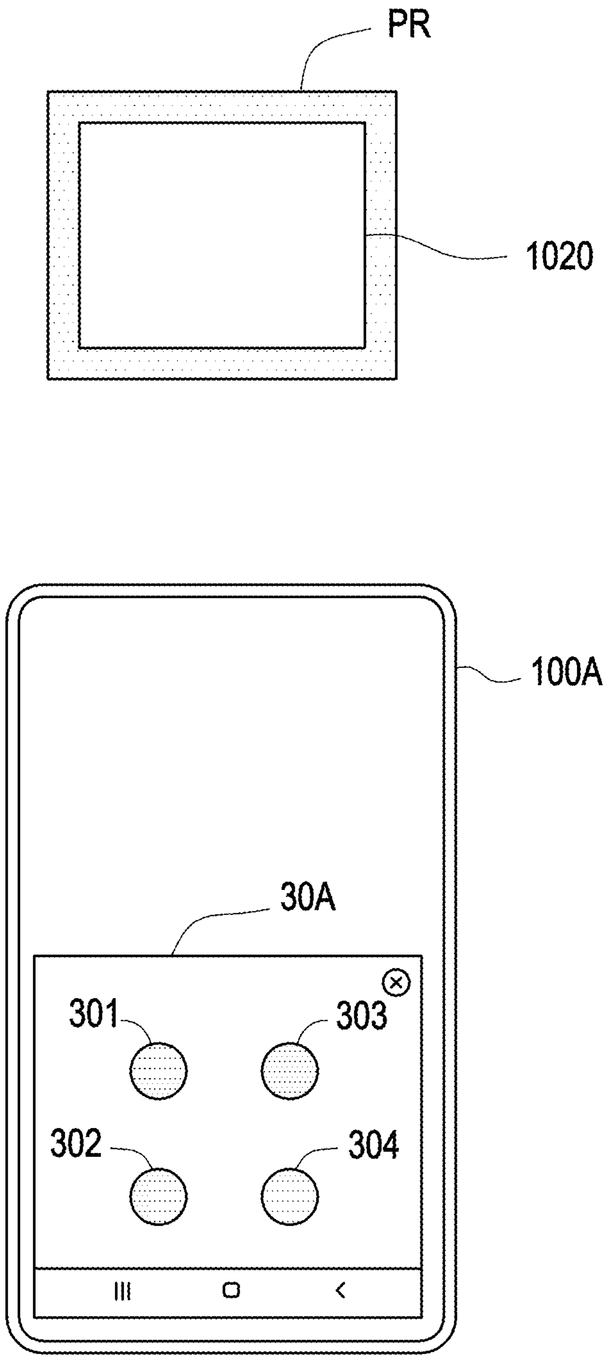

FIG. 9A and FIG. 9B are schematic diagrams illustrating changes in the operation of a function interface relative to a projected image according to an embodiment of the disclosure. The scenario shown in FIG. 9A is that the projected image 1010 projected by the projector 100B may initially exceed a projection range PR (projection screen or electronic whiteboard). Even if the current projected image 1010 exceeds the projection range PR, the first function icon 301 to the fourth function icon 304 in the four corners of the function interface 30A on the display 140A of the portable electronic device 100A are still initially presented in a rectangular configuration at the four corners. In order for the projected image 1010 to be adjusted within the projection range PR, the projected image 1010 may be reduced to fit within the projection range PR. This implementation scenario mainly demonstrates that reducing the projected image 1010 can eliminate situations where part of the projected image 1010 extends outside the projection range PR or overlaps with an obstacle, causing distortion. By reducing the projected image 1010 and projecting it into the projection range PR, or by reducing the projected image 1010 to avoid obstacles, such distortion issues can be resolved.

The scenario shown in FIG. 9B illustrates that the projected image 1020 projected by the projector 100B is located within the projection range PR. To adjust the projected image 1020 to match the size of the projection range PR, the first function icon 301 to the fourth function icon 304 may each perform touch-drag operations. The positions of the four corners of the projected image 1020 will change according to the movement trajectory of the touch-drag operation. The user may observe the corresponding movement of the projected image 1020 in real time, ultimately resulting in the projected image 1020 as shown in FIG. 9B.

In summary, the projected image correction system and method, along with the non-transitory computer-readable recording medium described in the embodiments of the disclosure have at least one of the following advantages. The system utilizes a portable electronic device to communicate with the projector. The portable electronic device may be a smartphone, tablet, laptop, smart watch, etc., but is not limited to these. Any device equipped with a processor is applicable to the present disclosure. The disclosure employs the touch input function of the portable electronic device to intuitively perform image correction on the projector, replacing traditional button adjustments and the cursor operations of a mouse-like remote control. Accordingly, the user's process of correcting the projected image is simplified and accelerated, making the correction process of the projected image more intuitive and convenient for the user.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the disclosure”, “the present disclosure” or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projected image correction system, comprising a projector and a portable electronic device; wherein:

the projector is configured to project a projected image;

the portable electronic device comprises a processor and a touch-sensitive display, and the portable electronic device is configured to be in communication connection with the projector, wherein the processor of the portable electronic device is configured to execute an application to:

activate the display to display a function interface, wherein the function interface comprises a plurality of function icons;

obtain a plurality of original coordinates of a plurality of adjustable points corresponding to the projected image of the projector;

arrange positions of the function icons on the function interface so that positional relationships of the function icons respectively correspond to positional relationships of the adjustable points in the projected image;

in response to a first touch-drag operation on a first function icon among the function icons of the function interface, generate first touch-input data for each unit of time, wherein the first function icon corresponds to a first adjustable point among the adjustable points, and the first touch-input data comprises a starting position, an ending position, and the unit of time required for the first function icon to move from the starting position to the ending position on the function interface;

in response to the first touch-drag operation being ended, move the first function icon from the ending position back to the starting position on the function interface;

calculate a first updated coordinate of the first adjustable point corresponding to the first function icon based on the first touch-input data; and transmit the first updated coordinate to the projector;

wherein the projector is configured to:

receive the first updated coordinate from the portable electronic device;

adjust the first adjustable point of the projected image according to the first updated coordinate.

2. The projected image correction system according to claim 1, wherein the processor of the portable electronic device is configured to execute the application to:

activate the display to display a user interface, wherein the user interface comprises a plurality of icons; and in response to one of the icons being selected, display the function interface corresponding to the selected icon.

3. The projected image correction system according to claim 1, wherein the first touch-input data further comprises a movement direction and a movement trajectory of the first function icon corresponding to the unit of time.

4. The projected image correction system according to claim 1, wherein an operation time of the first touch-drag operation sequentially comprises a plurality of unit of times, and the starting position of the first touch-input data corresponding to a first unit of time among the plurality of unit of times is a preset original position of the first function icon on the function interface.

5. The projected image correction system according to claim 4, wherein the ending position of the first touch-input data corresponding to a previous unit of time among the plurality of unit of times is used as the starting position of the first touch-input data corresponding to a subsequent unit of time.

6. The projected image correction system according to claim 4, wherein the processor of the portable electronic device is configured to execute the application to:

generate a first final touch-input data in response to an end of the first touch-drag operation, wherein the first final touch-input data comprises a touch stop position of the first function icon on the function interface;

calculate a first final updated coordinate of the first adjustable point corresponding to the first function icon based on the first final touch-input data; and transmit the first final updated coordinate to the projector;

wherein the projector is configured to:

receive the first final updated coordinate from the portable electronic device; and adjust the first adjustable point of the projected image to the first final updated coordinate.

7. The projected image correction system according to claim 1, wherein the plurality of function icons further comprise a second function icon, a third function icon, and a fourth function icon; the second function icon corresponds to a second adjustable point among the adjustable points, the third function icon corresponds to a third adjustable point among the adjustable points, and the fourth function icon corresponds to a fourth adjustable point among the adjustable points.

8. A projected image correction method, adapted for a projector and a portable electronic device, wherein the projector is configured to project a projected image, the portable electronic device comprises a processor and a touch-sensitive display, and the portable electronic device is configured to be in communication connection with the projector, the projected image correction method comprising: using the processor of the portable electronic device to execute an application to perform the following steps:

activating the display to display a function interface, wherein the function interface comprises a plurality of function icons;

obtaining a plurality of original coordinates of a plurality of adjustable points corresponding to the projected image of the projector;

arranging positions of the function icons on the function interface so that positional relationships of the function icons respectively correspond to positional relationships of the adjustable points in the projected image;

in response to a first touch-drag operation on a first function icon among the function icons of the function interface, generating first touch-input data for each unit of time, wherein the first function icon corresponds to a first adjustable point among the adjustable points, and the first touch-input data comprises a starting position, an ending position, and the unit of time required for the first function icon to move from the starting position to the ending position on the function interface;

in response to the first touch-drag operation being ended, moving the first function icon from the ending position back to the starting position on the function interface;

calculating a first updated coordinate of the first adjustable point corresponding to the first function icon based on the first touch-input data; and transmitting the first updated coordinate to the projector, so that the projector correspondingly adjusts the first adjustable point of the projected image according to the first updated coordinate.

9. The projected image correction method according to claim 8, further comprising the step of configuring the processor of the portable electronic device to execute the application to:

activate the display to display a user interface, wherein the user interface has a plurality of icons, and in response to one of the icons being selected, the function interface corresponding to the selected icon is displayed.

10. The projected image correction method according to claim 8, wherein the first touch-input data further comprises a movement direction and a movement trajectory of the first function icon corresponding to the unit of time.

11. The projected image correction method according to claim 8, wherein an operation time of the first touch-drag operation sequentially comprises a plurality of unit of times, and the starting position of the first touch-input data corresponding to a first unit of time among the plurality of unit of times is a preset original position of the first function icon on the function interface.

12. The projected image correction method according to claim 11, wherein the ending position of the first touch-input data corresponding to a previous unit of time among the plurality of unit of times is used as the starting position of the first touch-input data corresponding to a subsequent unit of time.

13. The projected image correction method according to claim 11, further comprising the step of configuring the processor of the portable electronic device to execute the application to:

generate a first final touch-input data in response to an end of the first touch-drag operation, wherein the first final touch-input data comprises a touch stop position of the first function icon on the function interface;

calculate a first final updated coordinate of the first adjustable point corresponding to the first function icon based on the first final touch-input data; and transmit the first final updated coordinate to the projector;

wherein the projector is configured to:

receive the first final updated coordinate from the portable electronic device;

adjust the first adjustable point of the projected image to the first final updated coordinate.

14. The projected image correction method according to claim 8, wherein the plurality of function icons further comprise a second function icon, a third function icon, and a fourth function icon, the second function icon corresponds to a second adjustable point among the adjustable points, the third function icon corresponds to a third adjustable point among the adjustable points, and the fourth function icon corresponds to a fourth adjustable point among the adjustable points.

15. A non-transitory computer-readable recording medium, configured to record an application, wherein a processor in a portable electronic device executes the application to perform the following steps:

activating a display of the portable electronic device to display a function interface, wherein the function interface comprises a plurality of function icons;

obtaining a plurality of original coordinates of a plurality of adjustable points from a projected image projected by a projector;

arranging positions of the function icons on the function interface so that positional relationships of the function icons respectively correspond to positional relationships of the adjustable points in the projected image;

in response to a first touch-drag operation on a first function icon among the function icons of the function interface, generating first touch-input data for each unit of time, wherein the first function icon corresponds to a first adjustable point among the adjustable points, and the first touch-input data comprises a starting position, an ending position, and the unit of time required for the first function icon to move from the starting position to the ending position on the function interface;

in response to the first touch-drag operation being ended, moving the first function icon from the ending position back to the starting position on the function interface;

calculating a first updated coordinate of the first adjustable point corresponding to the first function icon based on the first touch-input data; and transmitting the first updated coordinate to the projector, so that the projector correspondingly adjusts the first adjustable point of the projected image according to the first updated coordinate.

* * * * *